United States Patent
Tagami (10) Patent No.: US 11,629,662 B2
(45) Date of Patent: Apr. 18, 2023

(54) CONTROL DEVICE AND VEHICLE

(71) Applicant: HONDA MOTOR CO., LTD., Tokyo (JP)

(72) Inventor: Hiroshi Tagami, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/588,381

(22) Filed: Jan. 31, 2022

(65) Prior Publication Data

US 2022/0243676 A1 Aug. 4, 2022

(30) Foreign Application Priority Data

Feb. 4, 2021 (JP) .............................. JP2021-016668

(51) Int. Cl.
   *F02D 41/14* (2006.01)
   *B60W 20/00* (2016.01)
   (Continued)

(52) U.S. Cl.
   CPC .......... *F02D 41/1486* (2013.01); *B60W 20/00* (2013.01); *F02D 41/1454* (2013.01);
   (Continued)

(58) Field of Classification Search
   CPC ............. F02D 41/1486; F02D 41/1454; F02D 2200/92; F02D 2200/0802;
   (Continued)

(56) References Cited

U.S. PATENT DOCUMENTS

2016/0325731 A1* 11/2016 Yamazaki ................ B60K 6/48

FOREIGN PATENT DOCUMENTS

| JP | 2004263647 A | * | 9/2004 | ............ B60W 10/02 |
| JP | 3827980 B2 | * | 9/2006 | ............ B60K 6/485 |

(Continued)

OTHER PUBLICATIONS

Japanese Office Action for Japanese Patent Application No. 2021-016668 dated Nov. 22, 2022.

*Primary Examiner* — George C Jin
(74) *Attorney, Agent, or Firm* — Amin, Turocy & Watson, LLP (57) ABSTRACT

Provided is a control device for a vehicle, the vehicle including an internal combustion engine, a generator capable of being rotated by the internal combustion engine, a battery that stores power generated by rotation of the generator, and a motor that is supplied with power from the battery and outputs a driving force to a drive wheel, wherein, at a timing at which a requested output, which is requested when the internal combustion engine is operating with the internal combustion engine and the drive wheel not mechanically connected to each other and the internal combustion engine is performing a stoichiometric operation that operates in accordance with a theoretical air-to-fuel ratio, is equal to or greater than a threshold value, the control device starts to increase the number of rotations of the internal combustion engine to the number of rotations set in a rich operation where a ratio of a fuel of the internal combustion engine to oxygen is higher than the theoretical air-to-fuel ratio.

8 Claims, 5 Drawing Sheets

(51) Int. Cl.
*B60K 6/40* (2007.10)
*B60K 6/442* (2007.10)

(52) U.S. Cl.
CPC .............. *B60K 6/40* (2013.01); *B60K 6/442* (2013.01); *B60W 2510/0208* (2013.01); *B60W 2510/0619* (2013.01); *B60W 2520/10* (2013.01); *B60W 2530/12* (2013.01); *B60W 2710/0622* (2013.01); *B60W 2710/0644* (2013.01); *B60W 2710/0666* (2013.01); *B60Y 2200/92* (2013.01); *F02D 2200/0802* (2013.01); *F02D 2200/501* (2013.01)

(58) Field of Classification Search
CPC ............ F02D 2200/501; B60W 20/00; B60W 2510/0208; B60W 2510/0619; B60W 2520/10; B60W 2530/12; B60W 2710/0622; B60W 2710/0644; B60W 2710/0666; B60W 10/06; B60W 10/08; B60W 20/11; B60W 2510/244; B60W 2710/0672; B60K 6/40; B60K 6/442
See application file for complete search history.

(56) References Cited

FOREIGN PATENT DOCUMENTS

| | | |
|---|---|---|
| JP | 2015-145652 | 8/2015 |
| JP | 2018-127961 | 8/2018 |
| JP | 2020-093560 | 6/2020 |
| WO | 2011/074482 | 6/2011 |

\* cited by examiner

CONTROL DEVICE AND VEHICLE

CROSS-REFERENCE TO RELATED APPLICATION

Priority is claimed on Japanese Patent Application No. 2021-016668, filed Feb. 4, 2021, the content of which is incorporated herein by reference.

BACKGROUND

Field of the Invention

The present invention relates to a control device and a vehicle.

Description of Related Art

A technology for controlling the number of rotations and a torque of an internal combustion engine mounted in a hybrid vehicle is known. For example, Japanese Unexamined Patent Application, First Publication No. 2018-127961 discloses a hybrid vehicle that has reduced fluctuations in the number of rotations and the torque that occur when operation conditions are changed. In this technology, operation conditions are switched between a plurality of operation lines when the number of rotations and the torque of the internal combustion engine meet a predetermined condition.

SUMMARY

However, in the technology described in Japanese Unexamined Patent Application, First Publication No. 2018-127961, timings at which the operation line of the internal combustion engine can be switched are limited. For this reason, in the conventional technology, it may not be possible to reduce the discomfort felt by an occupant when the operation lines of an internal combustion engine are switched regardless of the operation point of the internal combustion engine.

The present invention has been made in view of such circumstances, and an object thereof is to provide a control device and a vehicle that can switch an operation line of an internal combustion engine regardless of an operation point of the internal combustion engine, and reduce discomfort felt by an occupant.

A control device and a vehicle according to the present invention have adopted the following configuration.

(1): A control device according to one aspect of the present invention is a control device for a vehicle, the vehicle including an internal combustion engine, a generator capable of being rotated by the internal combustion engine, a battery that stores power generated by rotation of the generator, and a motor that is supplied with power from the battery and outputs a driving force to a drive wheel, in which, at a timing at which a requested output, which is requested when the internal combustion engine is operating with the internal combustion engine and the drive wheel not mechanically connected to each other and the internal combustion engine is performing a stoichiometric operation that operates in accordance with a theoretical air-to-fuel ratio, is equal to or greater than a threshold value, the control device starts to increase the number of rotations of the internal combustion engine to the number of rotations set in a rich operation where a ratio of a fuel of the internal combustion engine to oxygen is higher than the theoretical air-to-fuel ratio.

(2): In the aspect of (1) described above, the control device limits an increase rate of a torque of the internal combustion engine when the stoichiometric operation is switched to the rich operation to increase the torque after the number of rotations of the internal combustion engine is increased to the number of rotations set in the rich operation while the internal combustion engine is operating with the internal combustion engine and the drive wheel not mechanically connected to each other and the internal combustion engine is performing the stoichiometric operation.

(3): In the aspect of (2) described above, the control device increases a degree of limit on the increase rate of the torque as the speed of the vehicle decreases.

(4): In the aspect of (1) described above, the control device limits an increase rate of an output of the electric motor when the stoichiometric operation is switched to the rich operation to increase the output after the number of rotations of the internal combustion engine is increased to the number of rotations set in the rich operation while the internal combustion engine is operating with the internal combustion engine and the drive wheel not mechanically connected to each other and the internal combustion engine is performing the stoichiometric operation.

(5): In the aspect of (4) described above, the control device increases a degree of limit on the increase rate of the output as the speed of the vehicle decreases.

(6): In the aspect of (4) described above, when the internal combustion engine is operating with the internal combustion engine and the drive wheel not mechanically connected to each other, the internal combustion engine is performing the stoichiometric operation, and a state of charge of the battery is equal to or less than a reference value, the control device increases the number of rotations of the internal combustion engine to the number of rotations set in the rich operation, switches the stoichiometric operation to the rich operation to increase the output of the electric motor, and limits the increase rate of the output.

(7): In the aspect of (1) described above, the control device switches the stoichiometric operation to the rich operation when a temperature of a catalyst in the internal combustion engine is equal to or higher than a predetermined value after the number of rotations of the internal combustion engine is increased to the number of rotations set in the rich operation while the internal combustion engine is operating with the internal combustion engine and the drive wheel not mechanically connected to each other and the internal combustion engine is performing the stoichiometric operation.

(8): A vehicle according to another aspect of the present invention is a vehicle including: an internal combustion engine; a generator capable of being rotated by the internal combustion engine; a battery that stores power generated by rotation of the generator; a motor that is supplied with power from the battery and outputs a driving force to a drive wheel; and a control device, in which, at a timing at which a requested output, which is requested when the internal combustion engine is operating with the internal combustion engine and the drive wheel not mechanically connected to each other and the internal combustion engine is performing a stoichiometric operation that operates in accordance with a theoretical air-to-fuel ratio, is equal to or greater than a threshold value, the control device starts to increase the number of rotations of the internal combustion engine to the number of rotations set in a rich operation where a ratio of a fuel of the internal combustion engine to oxygen is higher than the theoretical air-to-fuel ratio.

According to the Aspects of (1) to (8), an Operation Line of an Internal combustion engine can be switched regardless of an operation point of the internal combustion engine, and discomfort felt by the occupants can be reduced.

According to the aspects of (2) and (3), the discomfort felt by the occupants can be reduced when switching to a rich operation and increasing a torque of the internal combustion engine.

According to (4) to (6), the discomfort felt by the occupants can be reduced when switching to a rich operation and increasing an output of the internal combustion engine.

According to the aspect of (7), an operation mode can be appropriately switched according to a temperature of a catalyst.

DESCRIPTION OF EMBODIMENTS

Hereinafter, an embodiment of a control device and a vehicle according to the present invention will be described with reference to the drawings.

[Overall Configuration]

Figure 1:
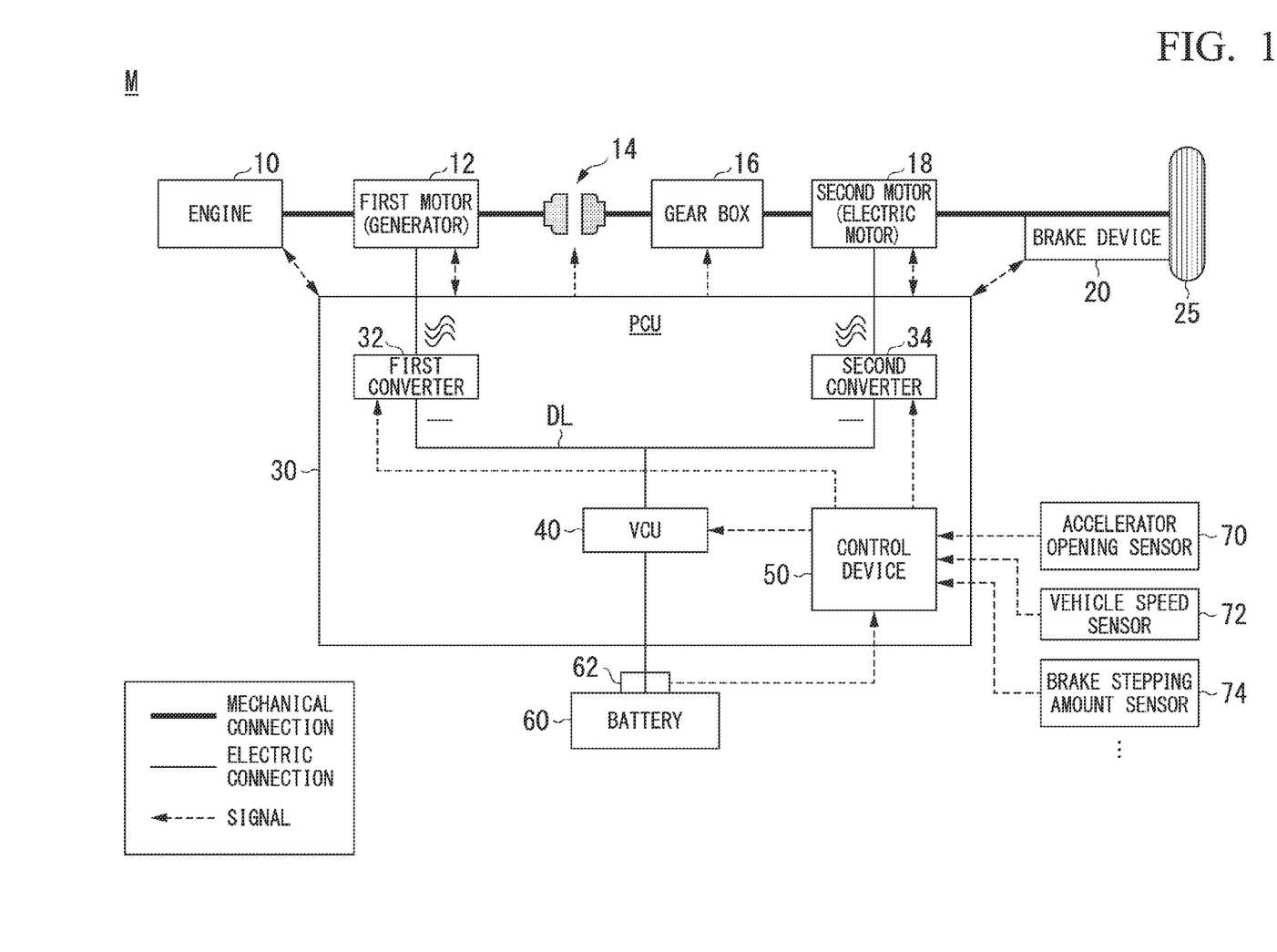
FIG. 1 is a diagram which shows an example of a configuration of a vehicle M according to the present embodiment.

FIG. 1 is a diagram which shows an example of a configuration of the vehicle M of the present embodiment. The vehicle M having the configuration shown in FIG. 1 is a hybrid vehicle capable of switching between a series method and a parallel method. The series method is a method in which an engine and a drive wheel are not mechanically connected, power of the engine is used exclusively for power generation by a generator, and generated electric power is supplied to an electric motor for traveling. The parallel method is a method in which the engine and the drive wheel can be mechanically connected (or via a fluid such as a torque converter), and the power of the engine can be transmitted to the drive wheel or used for power generation. The vehicle M having the configuration shown in FIG. 1 can switch between the series method and the parallel method by connecting or disconnecting a lockup clutch 14.

As shown in FIG. 1, the vehicle M is equipped with, for example, an engine 10, a first motor (generator) 12, a lockup clutch 14, a gearbox 16, a second motor (electric motor) 18, a brake device 20, and a drive wheel 25, a power control unit (PCU) 30, a battery 60, a battery sensor 62 such as a voltage sensor, a current sensor, or a temperature sensor, and vehicle sensors such as an accelerator opening sensor 70, a vehicle speed sensor 72, and a brake stepping amount sensor 74. This vehicle M includes at least the engine 10, the second motor 18, and the battery 60 as drive sources.

The engine 10 is an internal combustion engine that outputs power by burning fuel such as gasoline. The engine 10 is a reciprocating engine including, for example, a combustion chamber, a cylinder and a piston, an intake valve, an exhaust valve, a fuel injection device, an ignition plug, a connecting rod, and a crank shaft. In addition, the engine 10 may be a rotary engine.

The first motor 12 is, for example, a three-phase AC generator. The first motor 12 has a rotor connected to an output shaft (for example, a crank shaft) of the engine 10, and generates power by using power output by the engine 10. The output shaft of the engine 10 and the rotor of the first motor 12 are connected to a side of the drive wheel 25 via the lockup clutch 14.

The lockup clutch 14 switches between a state in which the output shaft of the engine 10 and the rotor of the first motor 12 are connected to a side of the drive wheel 25 and a state in which the output shaft and the rotor are disconnected from the side of the drive wheel 25, in response to an instruction from the PCU 30.

The gearbox 16 is a transmission. The gearbox 16 shifts the power output by the engine 10 and transmits it to the side of the drive wheel 25. A gear ratio of the gearbox 16 is designated by the PCU 30.

The second motor 18 is, for example, a three-phase AC electric motor. A rotor of the second motor 18 is connected to the drive wheel 25. The second motor 18 outputs power to the drive wheel 25 using the supplied electric power. Moreover, the second motor 18 generates power by using a kinetic energy of the vehicle M when the vehicle M decelerates, and stores the generated electric power in the battery 60 via a second converter 34 and a VCU 40, which will be described below.

The brake device 20 includes, for example, a brake caliper, a cylinder that transmits a hydraulic pressure to the brake caliper, and an electric motor that causes the cylinder to generate a hydraulic pressure. The brake device 20 may include a mechanism for transmitting a hydraulic pressure generated by an operation of a brake pedal to the cylinder via a master cylinder as a backup. The brake device 20 is not limited to the configuration described above, and may be an electronically controlled hydraulic brake device that transmits a hydraulic pressure of the master cylinder to the cylinder.

The PCU 30 includes, for example, a first converter 32, a second converter 34, a voltage control unit (VCU) 40, and a control device 50. It is only an example that these components are set to be in an one-piece configuration as the PCU 30, and these components may be disposed in a distributed manner.

The first converter 32 and the second converter 34 are, for example, AC to DC converters. DC side terminals of the first converter 32 and the second converter 34 are connected to a DC link DL. The battery 60 is connected to the DC link DL via the VCU 40. The first converter 32 converts an alternating current generated by the first motor 12 into a direct current and outputs it to the DC link DL, or converts the direct current supplied via the DC link DL into an alternating current and supplies it to the first motor 12. Similarly, the second converter 34 converts an alternating current generated by the second motor 18 into a direct current and outputs it to the DC link DL, or converts the direct current supplied via the DC link DL into an alternating current and supplies it to the second motor 18.

The VCU 40 is, for example, a DC-DC converter. The VCU 40 boosts power supplied from the battery 60 and outputs the boosted power to the DC link DL.

A function of the control device 50 will be described below. The battery 60 is, for example, a secondary battery such as a lithium-ion battery.

The accelerator opening sensor 70 is attached to an accelerator pedal, which is an example of an operator that receives an acceleration instruction from a driver, detects the amount of operation of the accelerator pedal, and outputs the amount to the control device 50 as an accelerator opening. The vehicle speed sensor 72 includes, for example, a wheel speed sensor attached to each wheel and a speed calculator, integrates wheel speeds detected by the wheel speed sensor to derive a speed (a vehicle speed) of the vehicle M, and outputs the speed to the control device 50. The brake stepping amount sensor 74 is attached to a brake pedal, which is an example of an operator that receives a deceleration or stop instruction by the driver, detects the amount of operation of the brake pedal, and outputs the amount to the control device 50 as a brake stepping amount.

Figure 2:
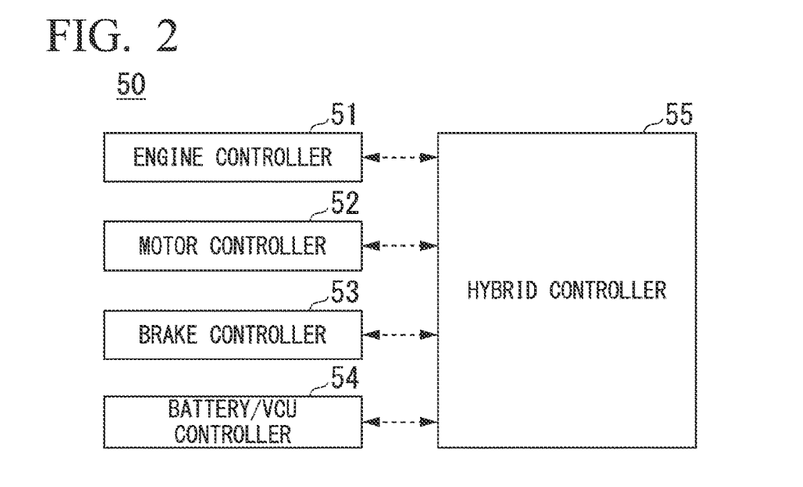
FIG. 2 is a diagram which shows an example of a functional configuration of a control device.

FIG. 2 is a diagram which shows an example of a functional configuration of the control device 50. The control device 50 includes, for example, an engine control unit 51, a motor control unit 52, a brake control unit 53, a battery/VCU control unit 54, and a hybrid control unit 55. These components are realized by, for example, a hardware processor such as a central processing unit (CPU) executing a program (software). In addition, some or all of these components may be realized by hardware (circuit units; including circuitry) such as large scale integration (LSI), an application specific integrated circuit (ASIC), a field-programmable gate array (FPGA), and a graphics processing unit (GPU), and may also be realized by software and hardware in cooperation.

In addition, each of the engine control unit 51, the motor control unit 52, the brake control unit 53, and the battery/VCU control unit 54 may be replaced with a control device separate from the hybrid control unit 55, for example, a control device such as an engine electronic control unit (ECU), a motor ECU, a brake ECU, or a battery ECU.

The engine control unit 51 performs ignition control, throttle opening control, fuel injection control, fuel cut control, and the like of the engine 10 in response to an instruction from the hybrid control unit 55. For example, the engine control unit 51 receives a command value regarding the number of rotations and a torque of the engine 10 from the hybrid control unit 55, and performs control such that the engine 10 is operated according to the command value.

The motor control unit 52 performs switching control of the first converter 32 and/or the second converter 34 in response to an instruction from the hybrid control unit 55.

The brake control unit 53 controls the brake device 20 in response to an instruction from the hybrid control unit 55.

The battery/VCU control unit 54 calculates a state of charge (SOC) of the battery 60 on the basis of an output of the battery sensor 62 attached to the battery 60, and outputs it to the hybrid control unit 55. In addition, the battery/VCU control unit 54 operates the VCU 40 in response to an instruction from the hybrid control unit 55 and raises a voltage of the DC link DL.

The hybrid control unit 55 determines a traveling mode on the basis of outputs of the accelerator opening sensor 70, the vehicle speed sensor 72, and the brake stepping amount sensor 74, and outputs an instruction to the engine control unit 51, the motor control unit 52, the brake control unit 53, and the battery/VCU control unit 54 according to the traveling mode. Furthermore, the hybrid control unit 55 determines a command value regarding the number of rotations and the torque of the engine 10 in each traveling mode, and transmits the determined command value to the engine control unit 51.

[Various Types of Traveling Modes]

The traveling modes determined by the hybrid control unit 55 will be described below. The traveling modes include the following modes.

(1) Series Hybrid Traveling Mode (ECVT)

In a series hybrid traveling mode, the hybrid control unit 55 disconnects the lockup clutch 14, supplies fuel to the engine 10 to operate it, and supplies electric power generated by the first motor 12 to the battery 60 and the second motor 18. Then, the second motor 18 is driven by using the electric power supplied from the first motor 12 or the battery 60, and the vehicle M is caused to travel using power from the second motor 18. The series hybrid traveling mode is an example of a mode in which an internal combustion engine is operating with the internal combustion engine and a drive wheel is not mechanically connected.

(2) EV Traveling Mode (EV)

In an EV traveling mode, the hybrid control unit 55 disconnects the lockup clutch 14, drives the second motor 18 using the electric power supplied from the battery 60, and causes the vehicle M to travel using the power from the second motor 18.

(3) Engine Drive Traveling Mode (LU)

In an engine drive traveling mode, the hybrid control unit 55 disconnects the lockup clutch 14, consumes fuel to operate the engine 10, and transmits at least some of the power output by the engine 10 to the drive wheel 25 to cause the vehicle M to travel. At this time, the first motor 12 may or may not generate power.

(4) Regeneration

At a time of regeneration, the hybrid control unit 55 disconnects the lockup clutch 14 and causes the second motor 18 to generate power using the kinetic energy of the vehicle M. The generated electric power at the time of regeneration is stored in the battery 60 or is discarded through a waste power operation.

[Outline of Operation Performed by the Control Device 50]

Next, with reference to FIG. 3, an outline of the operation performed by the control device 50 will be described. Unless otherwise specified, an operation of the control device 50 described below is assumed to be executed while the vehicle M is traveling in the ECVT mode. In this case, since the engine 10 is not directly connected to the drive wheel 25, the control device 50 is not limited by the vehicle speed, and can select an infinite number of combinations of the number of rotations and torque (an output=the number of rotations× torque) required to realize a predetermined output from the engine 10.

Figure 3:
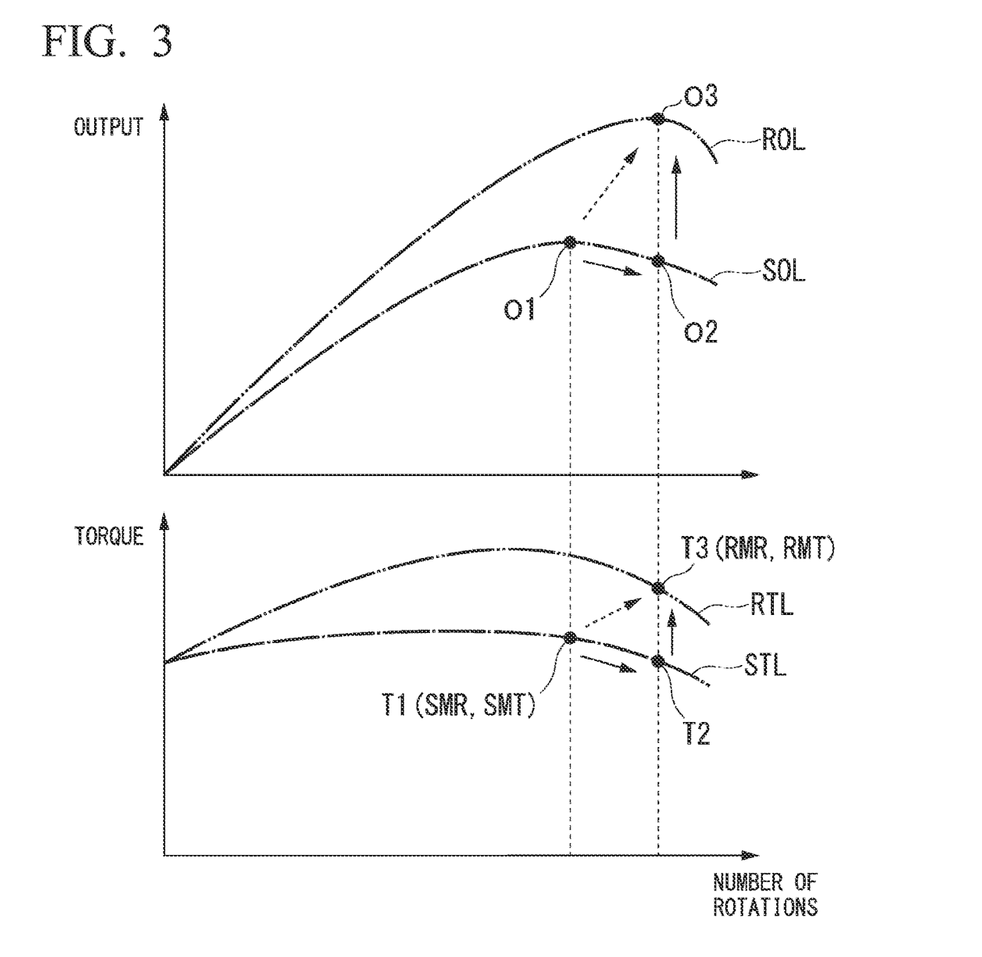
FIG. 3 is a graph for describing an outline of an operation performed by the control device.

FIG. 3 is a graph for describing the outline of the operation performed by the control device 50. SOL in an upper part of FIG. 3 shows a stoichiometric maximum output line that shows a relationship between the number of rotations in a stoichiometric operation of the engine 10 and a maximum output at a corresponding time, ROL shows a rich maximum output line that shows a relationship between the number of rotations in a rich operation of the engine 10 and the maximum output at a corresponding time, STL at the bottom of FIG. 3 shows a stoichiometric maximum torque line that shows a relationship between the number of rotations in the stoichiometric operation of the engine 10 and a maximum torque at a corresponding time, and RTL shows a rich maximum torque line that shows a relationship between the number of rotations in the rich operation of the engine 10 and the maximum torque at a corresponding time. Here, the stoichiometric operation indicates an operation mode in which the engine 10 operates according to a theoretical air-to-fuel ratio of oxygen and fuel, and the rich operation indicates an operation mode in which the engine 10 operates with a ratio of fuel of the engine 10 to oxygen higher than the theoretical air-to-fuel ratio. In FIG. 3, the number of rotations and a torque at a point T1 correspond to an output of a point O1, the number of rotations and a torque at a point T2 correspond to an output of a point O2, and the number of rotations and a torque at a point T3 correspond to an output of a point O3. In the following description, the number of rotations SMR at the point T1 may be referred to as "the maximum number of stoichiometric rotations," the torque SMT at the point T1 may be referred to as a "stoichiometric maximum torque," the number of rotations RMR at the point T3 may be referred to as "the maximum number of fuel-rich rotations," and the torque RMT at the point T3 may be referred to as a "fuel-rich maximum torque."

Now, for example, it is assumed that the driver strongly steps on the accelerator pedal during the stoichiometric operation of the vehicle M, and the engine 10 is operating at the point O1 at which the output is a maximum on the stoichiometric maximum output line SOL as a result of the accelerator opening sensor 70 detecting a high accelerator opening. When an operation at such a high output continues for a certain period of time, the temperature of the catalyst in the engine 10 rises, which may impair functionality of the engine 10. In such a case, when it is detected that the temperature of the catalyst in the engine 10 is equal to or higher than a predetermined value, an operation mode of the engine 10 is switched from the stoichiometric operation to the rich operation, and the engine 10 is cooled by heat of vaporization of an auxiliary fuel in the prior art. That is, in the prior art, the operation point of the engine 10 is switched from the point O1 at which the output is a maximum on the stoichiometric maximum output line SOL to the point O3 at which the output is a maximum on the rich maximum output line ROL.

However, when the operation of the engine 10 is switched from the stoichiometric operation to the rich operation in this manner, the number of rotations and the torque of the engine 10 suddenly increase as shown by a dotted arrow in FIG. 3, and occupants of the vehicle M may feel uncomfortable.

Therefore, when the driver steps strongly on the accelerator pedal during the stoichiometric operation of the vehicle M and the accelerator opening sensor 70 detects a requested output equal to or higher than a threshold value, even if the temperature of the catalyst in the engine 10 is less than the threshold value, the control device 50 of the present embodiment starts to change the number of rotations of the engine 10 to the number of rotations at the point O3 at which the output is a maximum on the rich maximum output line ROL at a timing at which the requested output is detected. That is, the control device 50 gradually changes an operation point of the engine 10 from the point O1 to the point O2.

After that, when it is detected that the temperature of the catalyst in the engine 10 is equal to or greater than a predetermined value, the control device 50 switches the operation mode of the engine 10 from the stoichiometric operation to the rich operation, and switches the operation point of the engine 10 from the point O2 to the point O3 by increasing the torque of the engine 10. At this time, when the control device 50 increases the torque of the engine 10, it performs rate limit processing for limiting an amount of increase (that is, an increase rate) in torque per unit time, thereby preventing the occupant of the vehicle M from feeling a sudden increase in torque. In particular, when a speed of the vehicle M is low, that is, when the second motor 18 is in a low rotation region, a high torque can be generated, and thus the control device 50 increases a degree of limit on an increase rate of the torque as the speed of the vehicle M decreases.

When the stoichiometric operation of the engine 10 is switched to the rich operation, the control device 50 can increase an output of the second motor 18 as the output increases. For example, during the stoichiometric operation, when the output of the second motor 18 is insufficient for a requested output, the control device 50 increases the output of the second motor 18. However, in this case, as in the case of the torque, a sudden increase in the output of the second motor 18 may make the occupant of the vehicle M feel uncomfortable. Therefore, when the output of the second motor 18 is increased, the control device 50 performs rate limit processing for limiting the amount of increase (that is, an increase rate) in the output per unit time, and tightens the degree of limit on the increase rate of the output as the speed of the vehicle M decreases. With the configuration described above, the control device 50 can smoothly switch from the stoichiometric operation to the rich operation without making the occupant of the vehicle M feel uncomfortable.

The description above is based on a premise that the driver strongly steps on the accelerator pedal during the stoichiometric operation or the rich operation of the vehicle M, and the accelerator opening sensor 70 detects a requested output equal to or greater than a threshold value. That is, the control device 50 sets the number of rotations and the torque of the engine 10 to a point on a stoichiometric maximum torque line STL or a rich maximum torque line RTL in such a situation.

Figure 4:
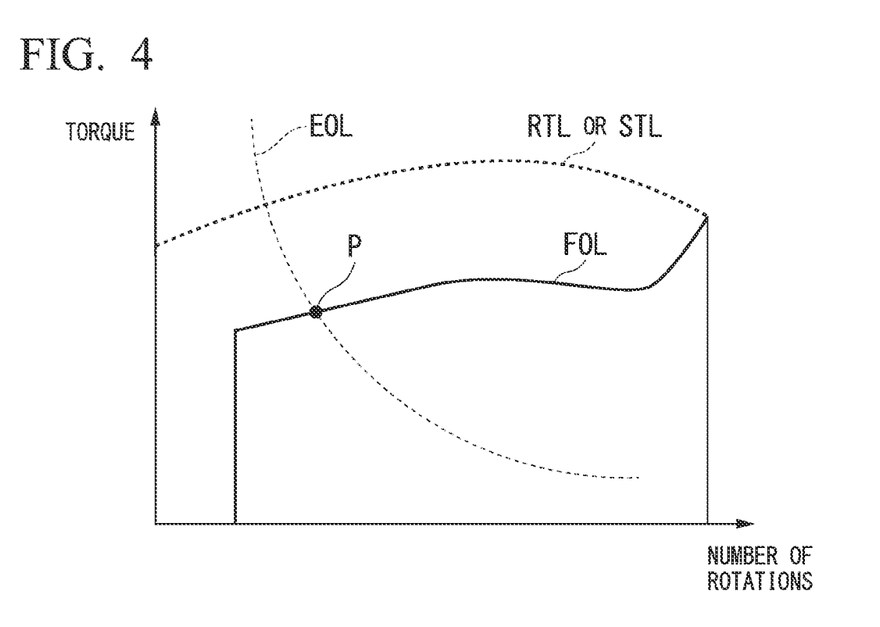
FIG. 4 is a diagram which shows an example of an optimum fuel consumption operation line of an engine.

On the other hand, when the driver does not step on the accelerator pedal strongly and the accelerator opening sensor 70 does not detect a requested output equal to or greater than the threshold value, the control device 50 sets the number of rotations and the torque of the engine 10 to a point on an optimum fuel consumption operation line that satisfies the requested output. FIG. 4 is a diagram which shows an example of the optimum fuel consumption operation line of the engine 10. The optimum fuel consumption operation line represents a combination that realizes an optimum fuel consumption of the number of rotations and the torque of the engine 10.

In FIG. 4, FOL represents the optimum fuel consumption operation line, and EOL represents an equal output line that realizes a requested output. When the accelerator opening sensor 70 detects a requested output equal to or greater than a threshold value, the control device 50 sets the number of rotations and the torque of the engine 10 to a point on the stoichiometric maximum torque line STL or the rich maximum torque line RTL that realizes a maximum output. On the other hand, when the accelerator opening sensor 70 detects a requested output less than the threshold value, the control device 50 sets the number of rotations and the torque of the engine 10 to an intersection P of the equal output line EOL that realizes the requested output and the optimum fuel consumption operation line FOL. That is, while the number of rotations and the torque of the engine 10 are set to the operation point O1 or O3 that realizes the maximum output when the driver of the vehicle M requires a high output, the number of rotations and the torque of the engine 10 are set to an operation point P that realizes an optimum fuel consumption for a given requested output when the driver of the vehicle M does not require a high output.

[Flow of Operation Performed by the Control Device 50]

Figure 5:
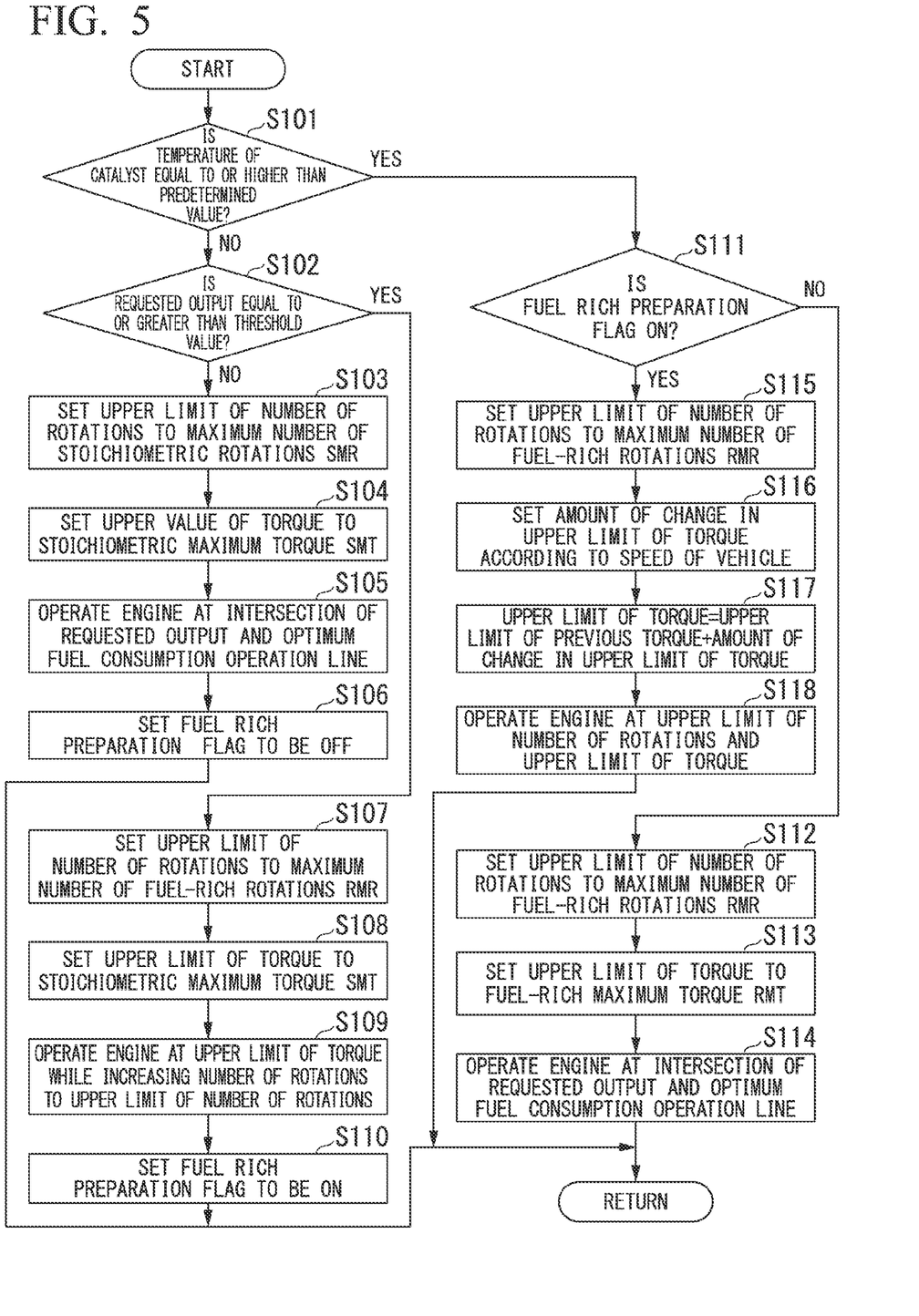
FIG. 5 is a flowchart which shows an example of a flow of an operation performed by the control device.

Next, a flow of operation performed by the control device 50 will be described with reference to FIG. 5. FIG. 5 is a flowchart which shows an example of the flow of operation performed by the control device 50.

First, the control device 50 determines whether the temperature of the catalyst of the engine 10 is equal to or higher than a predetermined value (step S101). When it is not determined that the temperature of the catalyst of the engine 10 is equal to or higher than the predetermined value, the control device 50 determines whether a requested output is equal to or greater than the threshold value (step S102). When it is not determined that the requested output is equal to or greater than the threshold value, the control device 50 executes the stoichiometric operation and sets an upper limit of the number of rotations of the engine 10 to the maximum number of stoichiometric rotations SMR (step S103). Furthermore, the control device 50 sets an upper limit of the torque of the engine 10 to the stoichiometric maximum torque SMT (step S104). Next, the control device 50 operates the number of rotations and the torque of the engine 10 at the intersection P of the optimum fuel consumption operation line and the requested output within a range of the set upper limit of the number of rotations and the upper limit of the torque (step S105). Next, the control device 50 sets a fuel rich preparation flag to be off (step S106) and returns the processing to step S101. As described above, the fuel rich preparation flag is identification information indicating whether the number of rotations during the stoichiometric operation has started to increase the number of rotations to the maximum number of fuel-rich rotations RMR in preparation for a smooth transition to rich operation in the future.

When it is determined that the requested output is equal to or greater than the threshold value, the control device 50 executes the stoichiometric operation and sets the upper limit of the number of rotations of the engine 10 to the maximum number of fuel-rich rotations RMR (step S107). Furthermore, the control device 50 sets the upper limit of the torque of the engine 10 to the stoichiometric maximum torque SMT (step S108). Next, the control device 50 operates the engine 10 of the vehicle M at the upper limit of the torque while starting to increase the number of rotations to the set upper limit of the number of rotations (step S109). Next, the control device 50 sets the fuel rich preparation flag to be on (step S110) and returns the processing to step S101.

When it is determined that the temperature of the catalyst of the engine 10 is equal to or higher than a predetermined value, the control device 50 determines whether the fuel rich preparation flag is on (step S111). When it is not determined that the fuel rich preparation flag is on, it means that the temperature of the catalyst has reached the predetermined value or higher without requiring an output equal to or greater than a threshold even once in a determination cycle. Therefore, the control device 50 executes a normal rich operation and sets the upper limit of the number of rotations to the maximum number of fuel-rich rotations RMR (step S112). Furthermore, the control device 50 sets the upper limit of the torque of the engine 10 to the fuel-rich maximum torque RMT (step S113). Next, the control device 50 operates the engine 10 of the vehicle M at the intersection P of the optimum fuel consumption operation line and the requested output within the range of the set upper limit of the number of rotations and the set upper limit of the torque (step S114). The processing is returned to step S101.

When it is determined that the fuel rich preparation flag is on, the control device 50 sets the upper limit of the number of rotations to the maximum number of fuel-rich rotations RMR (step S115). Next, the control device 50 refers to the speed of the vehicle M using the vehicle speed sensor 72, and sets an amount of change in the upper limit of the torque according to the speed of the vehicle M (step S116). Next, the control device 50 obtains the upper limit of a current torque by adding the amount of change in the upper limit of the torque to the upper limit of a previous torque (step S117). In this step, the fuel rich preparation flag is set to on, so that existence of the upper limit of the previous torque is guaranteed. Then, the control device 50 operates the engine 10 of the vehicle M at the set upper limit of the number of rotations and the set upper limit of the torque (step S118), and returns the processing to step S101. As long as the temperature of the catalyst is equal to or higher than the predetermined value, the processing of S115 to S118 is repeated, so that the upper limit of the torque approaches the fuel-rich maximum torque RMT, and the engine 10 is cooled by the rich operation. The processing of step S117 may be terminated when the upper limit of the torque is sufficiently close to or coincides with the fuel-rich maximum torque RMT.

According to the processing of the flowchart described above, when the requested output is equal to or greater than the threshold value during the stoichiometric operation of the engine 10, only the upper limit of the number of rotations starts to be increased to the maximum number of fuel-rich rotations RMR, and then, when the temperature of the catalyst is equal to or higher than a predetermined value, the torque of the engine 10 is increased while the upper limit of the torque is brought closer to the fuel-rich maximum torque RMT. As a result, it is possible to switch from the stoichiometric operation to the rich operation without making the occupant of the vehicle M feel uncomfortable.

Figure 6:
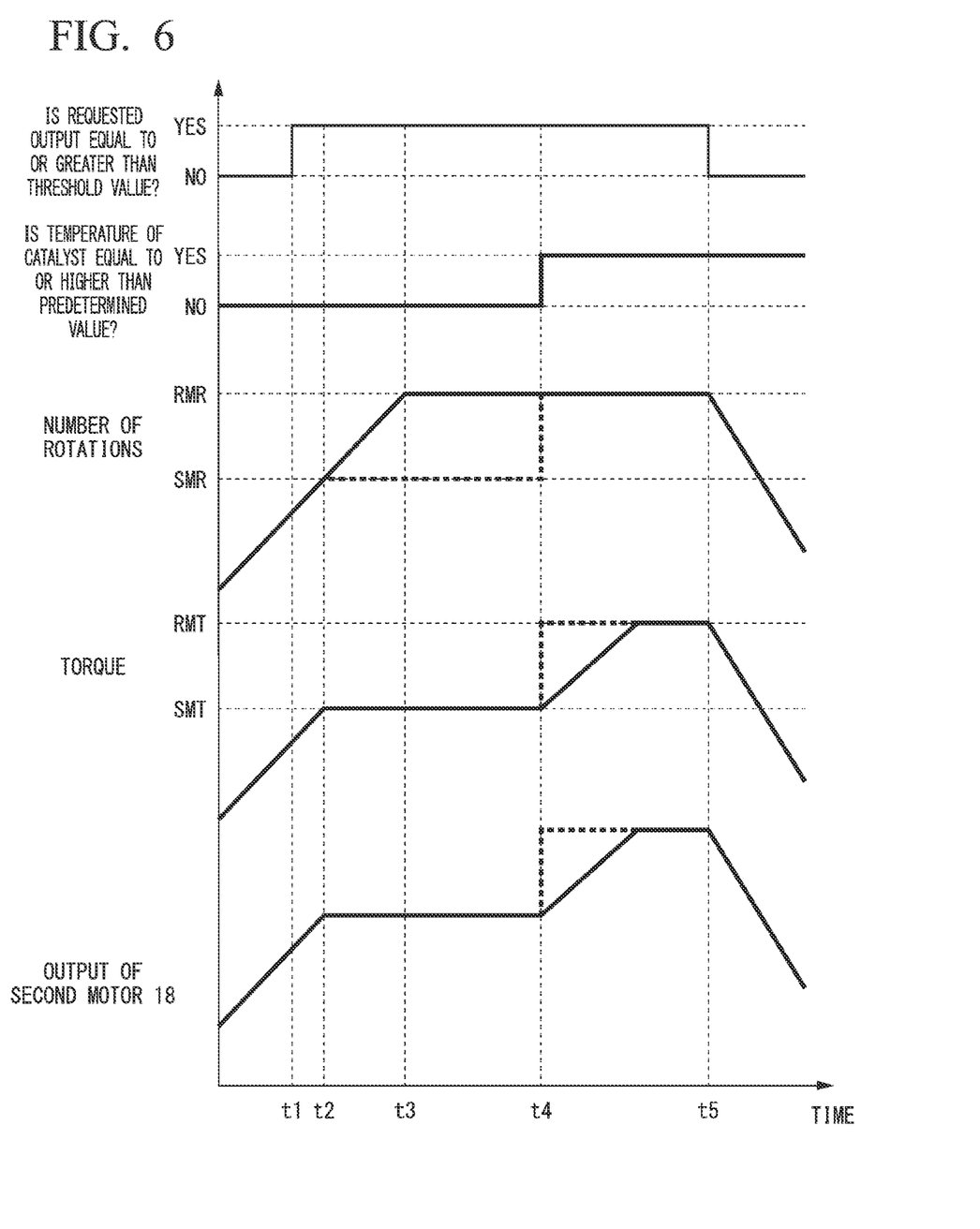
FIG. 6 is a timing chart which shows an example of the flow of an operation performed by the control device.

Next, with reference to FIG. 6, a flow of an operation performed by the control device 50 in an exemplary situation will be described. FIG. 6 is a timing chart which shows an example of the flow of an operation performed by the control device 50. In FIG. 6, a solid line shows the operation of the control device 50 according to the present embodiment, and a dotted line shows the operation of the control device according to the prior art (operations other than a section of a dotted line portion is the same as the operation of the present embodiment).

First, since the requested output is less than the threshold value and the temperature of the catalyst is less than the predetermined value before a time point t1, the engine 10 executes the stoichiometric operation. Next, at the time point t1, the requested output becomes equal to or greater than the threshold value. For this reason, the control device 50 changes the upper limit of the number of rotations from the maximum number of stoichiometric rotations SMR to the maximum number of fuel-rich rotations RMR, and starts to increase the number of rotations to the maximum number of fuel-rich rotations RMR. As a result, the number of rotations of the engine 10 reaches the maximum number of fuel-rich rotations RMR at a time point t3. After that, when the temperature of the catalyst is equal to or higher than the predetermined value at a time point t4, the control device 50 switches the stoichiometric operation of the engine 10 to the rich operation, and gradually increases the upper limit of the torque from the stoichiometric maximum torque SMT to the fuel-rich maximum torque RMT according to rate limit processing. As a result, at a time point t5, the number of rotations and the torque of the engine 10 become the maximum number of fuel-rich rotations RMR and the fuel-rich maximum torque RMT, respectively, and the stoichiometric operation is switched to the rich operation without making the occupant of the vehicle M feel uncomfortable.

On the other hand, in the case of a control device according to the prior art, at the time point t4, since the number of rotations is changed from the maximum number of stoichiometric rotations SMR to the maximum number of fuel-rich rotations RMR, and the torque is changed from the stoichiometric maximum torque SMT to the fuel-rich maximum torque RMT, the occupant of the vehicle M may feel uncomfortable with a sudden increase in torque.

The control device 50 also increases an output of the second motor 18 as the output increases due to a switching of the stoichiometric operation to the rich operation. In the situation of FIG. 6, the output of the second motor 18 is constant after the time point t2 even though the requested output becomes equal to or greater than the threshold value at the time point t1. As a reason for this, since the SoC of the battery 60 is equal to or less than a reference value, it can be assumed that the output of the second motor 18 does not increase even if the requested output is equal to or greater than the threshold value. For this reason, the control device 50 also increases the output of the second motor 18 after switching the stoichiometric operation to the rich operation when the SoC of the battery 60 is equal to or less than the reference value. At this time, as in the case of the torque, the upper limit of the output is gradually increased according to the rate limit processing so that the occupant of the vehicle M does not feel uncomfortable with the sudden change in the output.

According to the embodiment of the present invention described above, the operation mode of the engine 10 is smoothly changed from the stoichiometric operation to the rich operation according to the temperature of the catalyst and a magnitude of the requested output regardless of an operation point of the engine 10. As a result, it is possible to switch an operation line of the internal combustion engine regardless of the operation point of the internal combustion engine, and to reduce a discomfort that the occupant may feel.

Although a form for carrying out the present invention has been described above using the embodiment, the present invention is not limited to the embodiment, and various modifications and substitutions can be made within a range not departing from the gist of the present invention.

What is claimed is:

1. A control device for a vehicle, the vehicle including an internal combustion engine, a generator capable of being rotated by the internal combustion engine, a battery that stores power generated by rotation of the generator, and a motor that is supplied with power from the battery and outputs a driving force to a drive wheel,
wherein, at a timing at which a requested output, which is requested when the internal combustion engine is operating with the internal combustion engine and the drive wheel not mechanically connected to each other and the internal combustion engine is performing a stoichiometric operation that operates in accordance with a theoretical air-to-fuel ratio, is equal to or greater than a threshold value, the control device starts to increase the number of rotations of the internal combustion engine to the number of rotations set in a rich operation where a ratio of a fuel of the internal combustion engine to oxygen is higher than the theoretical air-to-fuel ratio.

2. The control device according to claim 1, wherein the control device limits an increase rate of a torque of the internal combustion engine when the stoichiometric operation is switched to the rich operation to increase the torque after the number of rotations of the internal combustion engine is increased to the number of rotations set in the rich operation while the internal combustion engine is operating with the internal combustion engine and the drive wheel not mechanically connected to each other and the internal combustion engine is performing the stoichiometric operation.

3. The control device according to claim 2, wherein the control device increases a degree of limit on the increase rate of the torque as the speed of the vehicle decreases.

4. The control device according to claim 1, wherein the control device limits an increase rate of an output of the electric motor when the stoichiometric operation is switched to the rich operation to increase the output after the number of rotations of the internal combustion engine is increased to the number of rotations set in the rich operation while the internal combustion engine is operating with the internal combustion engine and the drive wheel not mechanically connected to each other and the internal combustion engine is performing the stoichiometric operation.

5. The control device according to claim 4, wherein the control device increases a degree of limit on the increase rate of the output as the speed of the vehicle decreases.

6. The control device according to claim 4, wherein, when the internal combustion engine is operating with the internal combustion engine and the drive wheel not mechanically connected to each other, the internal combustion engine is performing the stoichiometric operation, and a state of charge of the battery is equal to or less than a reference value, the control device increases the number of rotations of the internal combustion engine to the number of rotations set in the rich operation, switches the stoichiometric operation to the rich operation to increase the output of the electric motor, and limits the increase rate of the output.

7. The control device according to claim 1, wherein the control device switches the stoichiometric operation to the rich operation when a temperature of a catalyst in the internal combustion engine is equal to or higher than a predetermined value after the number of rotations of the internal combustion engine is increased to the number of rotations set in the rich operation while the internal combustion engine is operating with the internal combustion engine and the drive wheel not mechanically connected to each other and the internal combustion engine is performing the stoichiometric operation.

8. A vehicle comprising:
an internal combustion engine;
a generator capable of being rotated by the internal combustion engine;
a battery that stores power generated by rotation of the generator;
a motor that is supplied with power from the battery and outputs a driving force to a drive wheel; and
a control device,
wherein, at a timing at which a requested output, which is requested when the internal combustion engine is operating with the internal combustion engine and the drive wheel not mechanically connected to each other and the internal combustion engine is performing a stoichiometric operation that operates in accordance with a theoretical air-to-fuel ratio, is equal to or greater than a threshold value, the control device starts to increase the number of rotations of the internal combustion engine to the number of rotations set in a rich operation where a ratio of a fuel of the internal combustion engine to oxygen is higher than the theoretical air-to-fuel ratio.

* * * * *